(12) United States Patent
Kim et al.

(10) Patent No.: US 10,693,696 B2
(45) Date of Patent: Jun. 23, 2020

(54) APPARATUS AND METHOD FOR TRANSMITTING AND RECEIVING SIGNALS IN WIRELESS COMMUNICATION SYSTEM

(71) Applicant: Samsung Electronics Co., Ltd., Suwon-si, Gyeonggi-do (KR)

(72) Inventors: Eunyong Kim, Yongin-si (KR); Kwangjin Ahn, Suwon-si (KR); Youngkwan Choi, Seoul (KR); Hoonkyung Cho, Bucheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/819,633

(22) Filed: Nov. 21, 2017

(65) Prior Publication Data

US 2018/0145858 A1  May 24, 2018

Related U.S. Application Data

(60) Provisional application No. 62/425,418, filed on Nov. 22, 2016.

(30) Foreign Application Priority Data

Dec. 7, 2016 (KR) .................. 10-2016-0166196

(51) Int. Cl.
*H04L 27/26* (2006.01)
*H04W 76/27* (2018.01)
*H04W 72/04* (2009.01)

(52) U.S. Cl.
CPC ...... *H04L 27/2618* (2013.01); *H04L 27/2621* (2013.01); *H04W 72/0406* (2013.01); *H04W 72/0453* (2013.01); *H04W 76/27* (2018.02)

(58) Field of Classification Search
CPC ............. H04L 27/2614; H04L 27/2618; H04L 27/2621; H04L 5/001; H04W 76/27;
(Continued)

(56) References Cited

U.S. PATENT DOCUMENTS 9,276,790 B2   3/2016 Zheng et al.
2009/0110033 A1* 4/2009 Shattil .................. H04B 1/7174
                                                           375/141
(Continued)

FOREIGN PATENT DOCUMENTS

WO   2016-167614 A1   10/2016

OTHER PUBLICATIONS

International Search Report dated Feb. 22, 2018, issued in International Application No. PCT/KR2017/013332.
(Continued)

*Primary Examiner* — Kibrom T Hailu
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In a wireless communication system according to an embodiment, a signal transmission method of a transmitting apparatus includes determining a phase for each predetermined frequency band unit, applying the determined phase to a signal generated for each predetermined frequency band unit, and transmitting the signal.

18 Claims, 11 Drawing Sheets

(58) Field of Classification Search
CPC ......... H04W 72/0406; H04W 72/0453; H04W 52/146; H04W 72/04
See application file for complete search history.

(56) References Cited

U.S. PATENT DOCUMENTS

| | | |
|---|---|---|
| 2011/0216733 A1 | 9/2011 | Han et al. |
| 2011/0280189 A1* | 11/2011 | Tsuboi ................. H04L 5/001 370/328 |
| 2012/0026962 A1* | 2/2012 | Inoue ................ H04L 27/2613 370/329 |
| 2012/0033643 A1* | 2/2012 | Noh .................. H04L 5/0048 370/335 |
| 2012/0093088 A1* | 4/2012 | Yang .................. H04L 5/001 370/328 |
| 2012/0213190 A1* | 8/2012 | Yoon .................. H04L 5/001 370/329 |
| 2012/0258762 A1 | 10/2012 | Goto et al. |
| 2012/0269136 A1* | 10/2012 | Seo ................... H04L 5/0037 370/329 |
| 2012/0300732 A1* | 11/2012 | Ode ................... H04B 7/022 370/329 |
| 2012/0307775 A1* | 12/2012 | Chung ............... H04L 1/1671 370/329 |
| 2014/0153507 A1* | 6/2014 | Yang ................ H04L 27/2602 370/329 |
| 2015/0359029 A1* | 12/2015 | Seo ................... H04L 1/18 370/329 |
| 2016/0119073 A1 | 4/2016 | Vilaipornsawai et al. |
| 2016/0173305 A1 | 6/2016 | Zheng et al. |
| 2016/0269219 A1 | 9/2016 | Wang et al. |
| 2018/0062904 A1 | 3/2018 | Hwang et al. |

OTHER PUBLICATIONS

Extended European Search Report dated Sep. 13, 2019, issued in a counterpart European application No. 17873507.2-1231 /3510740.
Samsung: "DL RS for carrier aggregation with reduced Papr", 3GPP Draft; R1-090096 DL RS for Carrier Aggregation With Reduced Papr, 3rd Generation Partnership Project (3GPP), Mobile Competence Centre; 650, Route Des Lucioles ; F-06921 Sophia-Antipolis Cedex ; France, vol. RAN WG1, No. XP050597168; Jan. 7, 2009; Ljubljana, Slovenia.
LG Electronics: "CM Increase for PUCCH/DM RS in Non-contiguous Allocation", 3GPP Draft; R1-100658 LG ULDMRS CM, 3rd Generation Partnershit Project 13GPP), Mobile Competence Centre; vol. RAN WG1, No. XP050418255; Jan. 12, 2010; Valencia, Spain.
Huawei et al: "Design for Multi-PRB PUCCH format based on PUCCH format 3", 3GPP Draft; R1-154334, 3rd Generation Partnership Project (3GPP), Mobile Competence Centre; vol. RAN WG1, No. XP051001655; Aug. 23, 2015; Beijing, China.
Sassan Ahmadi: "Lte-advanced: A practical systems approach to understanding 3gpp lte releases 10 and 11 radio access technologies", XP002793781; Jan. 1, 2014; Academic Press, USA.
Huawei et al: "PUCCH format for eLAA", 3GPP Draft; R1-162584, 3rd Generation Partnership Project (3GPP), Mobile Competence Centre; vol. RAN WG1, No. XP051080272; Apr. 2, 2016; Busan, Korea.

* cited by examiner

APPARATUS AND METHOD FOR TRANSMITTING AND RECEIVING SIGNALS IN WIRELESS COMMUNICATION SYSTEM

CROSS-REFERENCE TO RELATED APPLICATION(S)

This application claims the benefit under 35 U.S.C. § 119(e) of a U.S. Provisional application filed on Nov. 22, 2016 in the U.S. Patent and Trademark Office and assigned Ser. No. 62/425,418, and under 35 U.S.C. § 119(a) of a Korean patent application filed on Dec. 7, 2016 in the Korean Intellectual Property Office and assigned Serial number 10-2016-0166196, the entire disclosure of which is hereby incorporated by reference.

TECHNICAL FIELD

The present disclosure relates generally to a wireless communication system. More particularly, the present disclosure relates to an apparatus and method for reducing a peak-to-average power ratio (PAPR) of a time domain signal in a wireless communication system using a plurality of frequency resources simultaneously.

BACKGROUND

To meet increasing demands for wireless data traffic after commercialization of the fourth generation (4G) communication system, efforts have been made to develop an improved fifth generation (5G) or pre-5G communication system. Therefore, the 5G or pre-5G communication system is also called a beyond 4G network or a post long term evolution (LTE) system.

The 5G communication system is considered to be implemented in higher frequency (mmWave) bands so as to accomplish higher data rates. To decrease propagation loss of the radio waves and increase the transmission distance, various techniques such as beamforming, massive multiple-input multiple-output (MIMO), full dimensional MIMO (FD-MIMO), array antenna, analog beamforming, and large scale antenna techniques are being discussed in the 5G communication system.

Additionally, in the 5G communication system, development for system network improvement is underway based on an advanced small cell, a cloud radio access network (cloud RAN), an ultra-dense network, device-to-device (D2D) communication, wireless backhaul, a moving network, cooperative communication, coordinated multi-points (CoMP), reception-end interference cancellation, and the like.

Further, in the 5G system, hybrid frequency shift keying (FSK) and quadrature amplitude modulation (QAM) modulation (FQAM) and sliding window superposition coding (SWSC) are being developed as an advanced coding modulation (ACM) schemes, and filter bank multi carrier (FBMC), non-orthogonal multiple access (NOMA), and sparse code multiple access (SCMA) are also being developed as advanced access technologies.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

Meanwhile, a need has arisen for a method and apparatus for reducing a peak-to-average power ratio (PAPR) of a time domain signal in a wireless communication network that uses a plurality of frequency resources simultaneously.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for reducing a peak-to-average power ratio (PAPR) of a time domain signal in a wireless communication network that uses a plurality of frequency resources simultaneously.

In accordance with an embodiment of the present disclosure, a signal transmission method of a transmitting apparatus in a wireless communication system is provided. The method may comprise determining a phase for each predetermined frequency band unit, applying the determined phase to a signal generated for each predetermined frequency band unit, and transmitting the signal.

In accordance with another embodiment of the present disclosure, a transmitting apparatus in a wireless communication system is provided. The apparatus may comprise a transceiver configured to transmit and receive a signal, and a controller configured to determine a phase for each predetermined frequency band unit, to apply the determined phase to a signal generated for each predetermined frequency band unit, and to control the transceiver to transmit the signal.

In accordance with another embodiment of the present disclosure, a signal reception method of a receiving apparatus in a wireless communication system is provided. The apparatus may comprise receiving signal generation information for generating signals of different sequences, for each predetermined frequency band unit, and when a signal generated for each predetermined frequency band unit is received, decoding the received signal, based on the signal generation information.

In accordance with another embodiment of the present disclosure, a receiving apparatus in a wireless communication system may comprise a transceiver configured to transmit and receive a signal, and a controller configured to control the transceiver to receive signal generation information for generating signals of different sequences, for each predetermined frequency band unit, and when a signal generated for each predetermined frequency band unit is received, to decode the received signal, based on the signal generation information.

According to embodiments of the present disclosure, the PAPR is reduced in the wireless communication system using a plurality of frequency resources at the same time. Therefore, the transmitting apparatus can improve throughput and coverage by transmitting signals with higher average power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
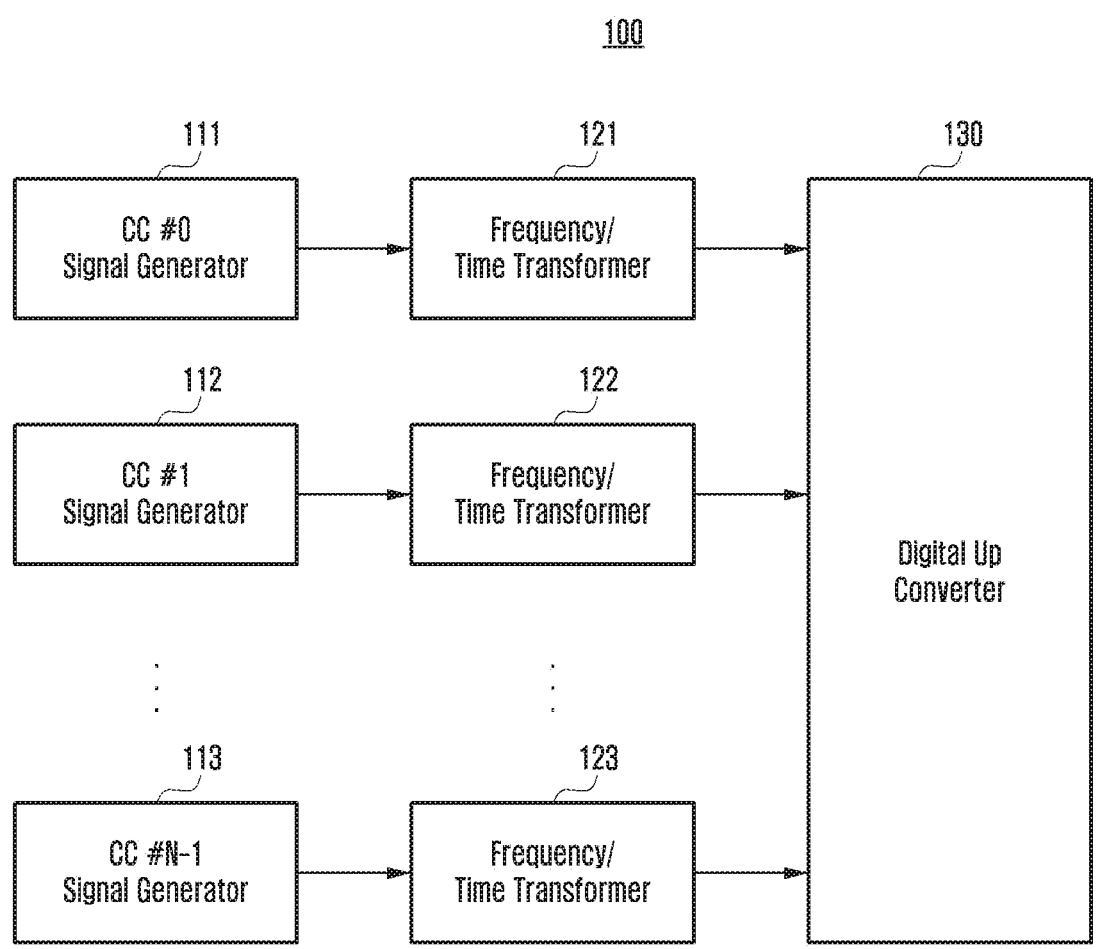
FIG. 1 is a block diagram illustrating elements of a transmitting apparatus in a typical multi-frequency resource utilization system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements are exaggerated, omitted or shown schematically in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to drive one or more central processing units (CPUs) in a device or a secure multimedia card. Also, in embodiments, a unit may include one or more processors.

An apparatus according to the present disclosure may include a mobile terminal in general, and may indicate any electronic device that has subscribed to a mobile communication system and is to receive a service from the mobile communication system. The mobile terminal may include a smart device such as a smart phone or a tablet personal computer (PC), which is merely and not to be construed as a limitation of the present disclosure.

The present disclosure relates to a method and apparatus for reducing a peak-to-average power ratio (PAPR) of a time domain signal in a cellular wireless communications network that uses a plurality of frequency resources simultaneously. More particularly, the present disclosure relates to a method and apparatus for effectively compensating for a problem that the PAPR increases when a transmitting apparatus simultaneously transmits the same signal on different frequency resources.

The most effective method of increasing the throughput of a mobile communication system is to utilize more frequency resources. For this, a frequency band may be divided into component carrier (CC) units.

However, if sequences are generated in CC units and the generated sequences are transmitted simultaneously, an increase of the PAPR may be caused due to the repeated transmission of the same sequence on the frequency axis.

Also, in case of the transmission of a reference signal (RS) in one CC, the PAPR may be increased when the sequence is repeated on the frequency axis.

The present disclosure described hereinafter may be extendedly applied to all communication systems in which the same sequence may be repeated in a specific frequency block unit.

Specifically, in a cellular wireless communication system such as long-term evolution (LTE) and pre-fifth generation (5G), a variety of physical channels and signals may be wirelessly transmitted in a signal waveform on the time axis transformed through multiplexing on the frequency axis. The signal component of the frequency axis may be designed to have a specific range of power. However, in a process of transforming the signal component of the frequency axis into that of the time axis, the power of the time component signal has a wide range of distribution. As a means of expressing the range of signal transmission power, the PAPR may be used. The PAPR indicates the influence of a baseband transmission signal on a transmitting apparatus, and may mean a ratio of the peak power to the average power.

In a wireless communication system, the range of signal sizes that can ensure the linearity of an amplifier of a transmitting apparatus is limited. Therefore, transmitting a signal with a high PAPR without deteriorating the signal quality is disadvantageous because the average power should be lowered so that the maximum power is included in a linear section. Conversely, transmitting a signal with a low PAPR is advantageous because it can increase the signal average power without degrading the signal quality.

In general, when a signal has a repetitive characteristic on the frequency axis, a time component signal corresponding to the repeated frequency difference has a large power, which causes the degradation of PAPR. In order to prevent this, standards such as LTE and pre-5G may include a procedure to randomize the signal so that it is not repeated on the frequency axis.

However, many CCs are being introduced to utilize more frequency resources for an increase of throughput. In this case, a transmitting apparatus generates a signal for each CC, and this may cause a case where the same signal is repeated in CC units on the frequency axis. Thus, the PAPR may be increased.

FIG. 1 is a block diagram illustrating elements of a transmitting apparatus in a typical multi-frequency resource utilization system according to an embodiment of the present disclosure.

Specifically, in order to transmit a plurality of CCs, the transmitting apparatus 100 may generate a signal for each CC as shown in FIG. 1. For example, the transmitting apparatus 100 may include a signal generator 111 for a first CC, a signal generator 112 for a second CC, and a signal generator 113 for an Nth CC. Each of the signal generators 111, 112 and 113 may generate a signal to be transmitted at each of the first to Nth CCs.

In addition, the transmitting apparatus 100 may transform the signal generated for each CC into a time component signal through frequency/time conversion. For example, the transmitting apparatus 100 may include a frequency/time transformer 121, a frequency/time transformer 122, and a frequency/time transformer 123. Each of the frequency/time transformers 121, 122 and 123 may transform the signal generated through each of the signal generators 111, 112 and 113 into a time component signal through frequency/time conversion.

The transmitting apparatus 100 may shift the center frequencies of the transformed time component signals through a digital up converter (DUC) 130 and then transmit them to a receiving apparatus.

Figure 2:
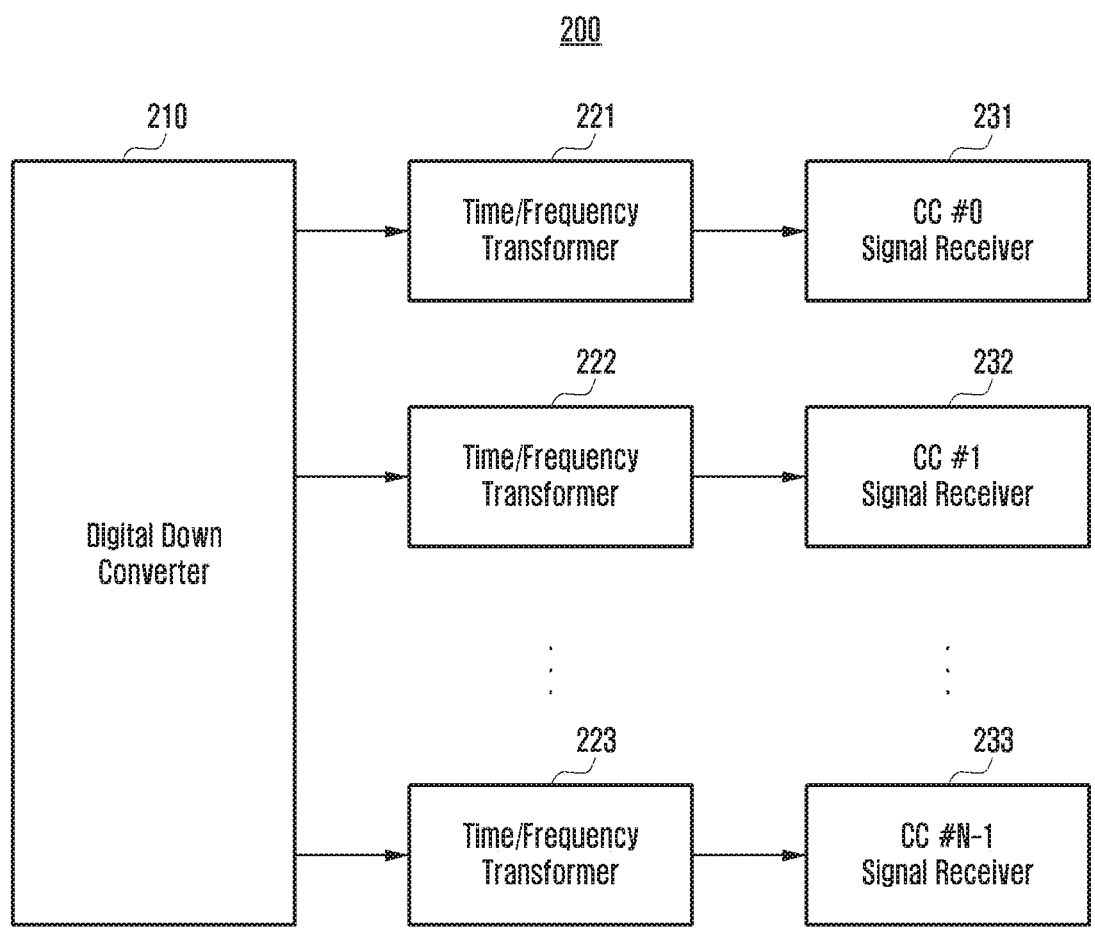
FIG. 2 is a block diagram illustrating elements of a receiving apparatus in a typical multi-frequency resource utilization system according to an embodiment of the present disclosure.

Meanwhile, FIG. 2 is a block diagram illustrating elements of a receiving apparatus 200 that receives signals from the transmitting apparatus 100 according to an embodiment of the present disclosure. Specifically, the receiving apparatus 200 may separate a signal of each center frequency into signals for respective CCs through a digital down converter (DDC) 210.

The receiving apparatus 200 may transform the separated signal for each CC into a frequency component signal through time/frequency conversion. For example, the receiving apparatus 200 may include a time/frequency transformer 221, a time/frequency transformer 222, and a time/frequency transformer 223. Each of the time/frequency transformers 221, 222 and 223 may transform the signal separated for each CC into a frequency component signal through time/frequency conversion.

In addition, the receiving apparatus 200 may perform the reception of a signal for each CC. For example, the receiving apparatus 200 may include a signal receiver 231 for a first CC, a signal receiver 232 for a second CC, and a signal receiver 233 for an Nth CC. Each of the signal receivers 231, 232 and 233 may receive a signal transmitted through each of the first to Nth CCs.

By the way, when the transmitting apparatus 100 generates a signal for each CC, the same signal may be repeated in CC units on the frequency axis. This may cause an increase of PAPR.

Figure 3:
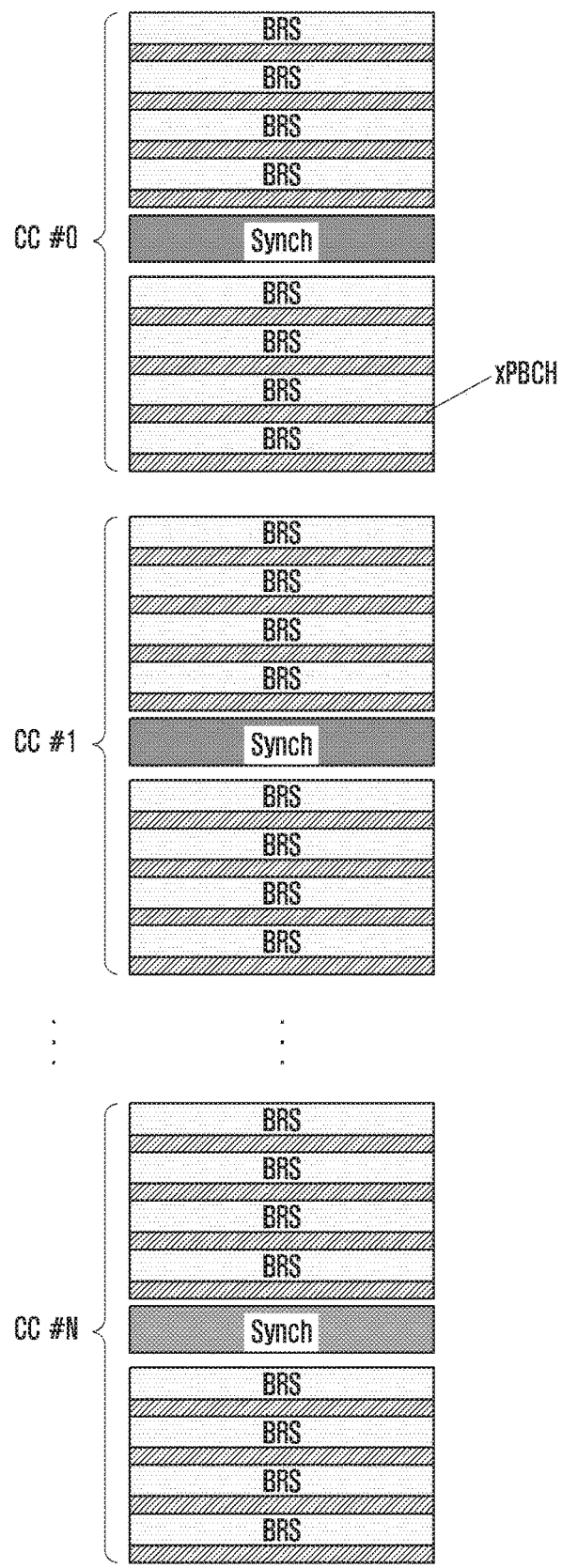
FIG. 3 is a diagram illustrating a signal transmitted at each orthogonal frequency division multiplexing (OFDM) symbol of subframes #0 and #25 in the Pre-fifth generation (5G) standard according to an embodiment of the present disclosure.

For example, according to the Pre-5G standard, a control signal having a form as shown in FIG. 3 may be transmitted on the downlink through each orthogonal frequency division multiplexing (OFDM) symbol of subframe #0 and subframe #25 in a radio frame composed of 50 subframes.

However, FIG. 3 is a conceptual diagram simply showing the multiplexing on the frequency axis instead of actually showing all of subcarriers according to an embodiment of the present disclosure.

Referring to FIG. 3, a signal transmitted in the subframe may be formed by multiplexing, on the frequency axis, a synchronizing signal, a beam RS (BRS), and a physical broadcast channel (xPBCH) of the Pre-5G standard. The synchronizing signal and the BRS may be determined according to the value of a physical cell ID (PCID) of the corresponding cell. Also, the xPBCH may be determined according to the PCID of the corresponding cell and a master information block (MIB) message. For example, if eight CCs have the same PCID value and if there is no difference in the MIB message for the respective CCs, the perfectly identical signal is repeated eight times on the frequency axis. Therefore, the PAPR may be increased by about 9 dB.

Meanwhile, even in one CC, a certain signal may be repeated on the frequency axis, thus causing an increase of PAPR.

Figure 4:
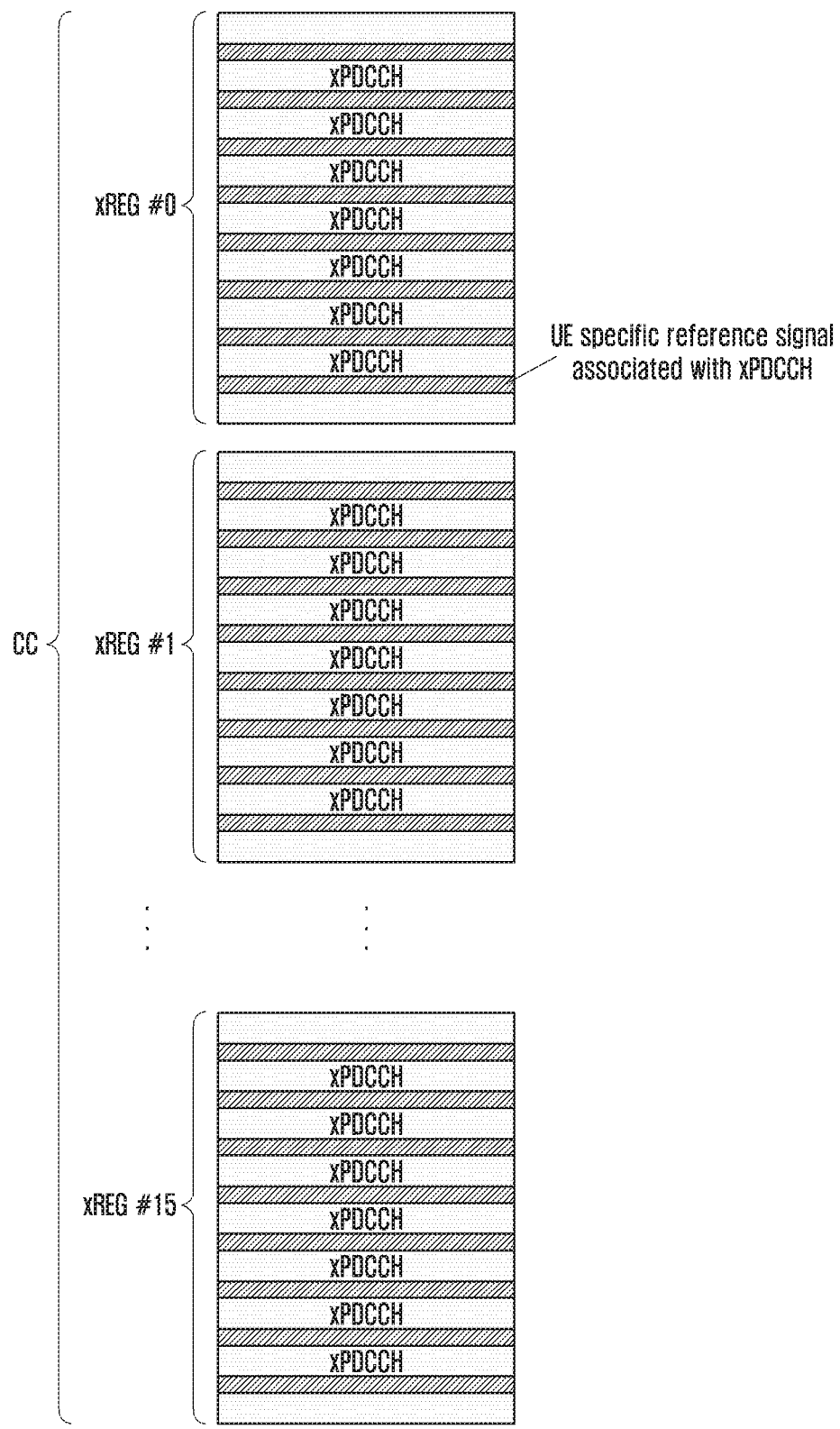
FIG. 4 is a diagram illustrating a signal transmitted at an OFDM symbol where physical downlink control channel (xPDCCH) is transmitted in the pre-5G standard according to an embodiment of the present disclosure.

Specifically, FIG. 4 is a diagram illustrating a signal transmitted at an OFDM symbol where a physical downlink control channel (xPDCCH) of the Pre-5G standard is transmitted according to an embodiment of the present disclosure.

As shown in FIG. 4, the xPDCCH may be multiplexed on the frequency axis in one OFDM symbol together with a user equipment (UE)-specific RS associated with xPDCCH used for channel estimation in case of demodulating the xPDCCH signal. However, FIG. 4 is a conceptual diagram simply showing the multiplexing on the frequency axis instead of actually showing all of subcarriers.

The xPDCCH transmission symbol has 16 resource element groups (xREGs) per CC, and each xREG may be composed of 48 resource elements (REs (tone)) used for xPDCCH transmission. In addition, the UE-specific RS associated with xPDCCH used for channel estimation in case of receiving the xPDCCH uses 24 REs per xREG and may be multiplexed with the 48 REs on the frequency axis. The xPDCCH may be randomized by control information to be transmitted to the terminal. However, the UE-specific RS associated with xPDCCH may repeatedly use the same sequence that depends on only the RS identification (RS ID) value in every xREG unit. Here, the RS ID may use the as a default value, and may use a setting value separately. For example, when the transmitting apparatus transmits the xPDCCH to one receiving apparatus by using a maximum of 16 xREGs, the sequence of the UE-specific RS associated with xPDCCH may be repeated 16 times, and thereby the PAPR may be greatly increased. As the number of repetitions of the same signal on the frequency axis increases, the PAPR increase width may become greater.

Hereinafter, a method and apparatus for reducing the PAPR in a cellular wireless communication system that uses a plurality of frequency resources simultaneously will be described in detail.

Specifically, as an embodiment of the present disclosure, a method by which the transmitting apparatus can reduce the PAPR independently without agreement between the transmitting and receiving apparatuses will be described. In addition, as another embodiment of the present disclosure, a method for further reducing the PAPR through agreement between the transmitting and receiving apparatuses will be described.

Figure 5:
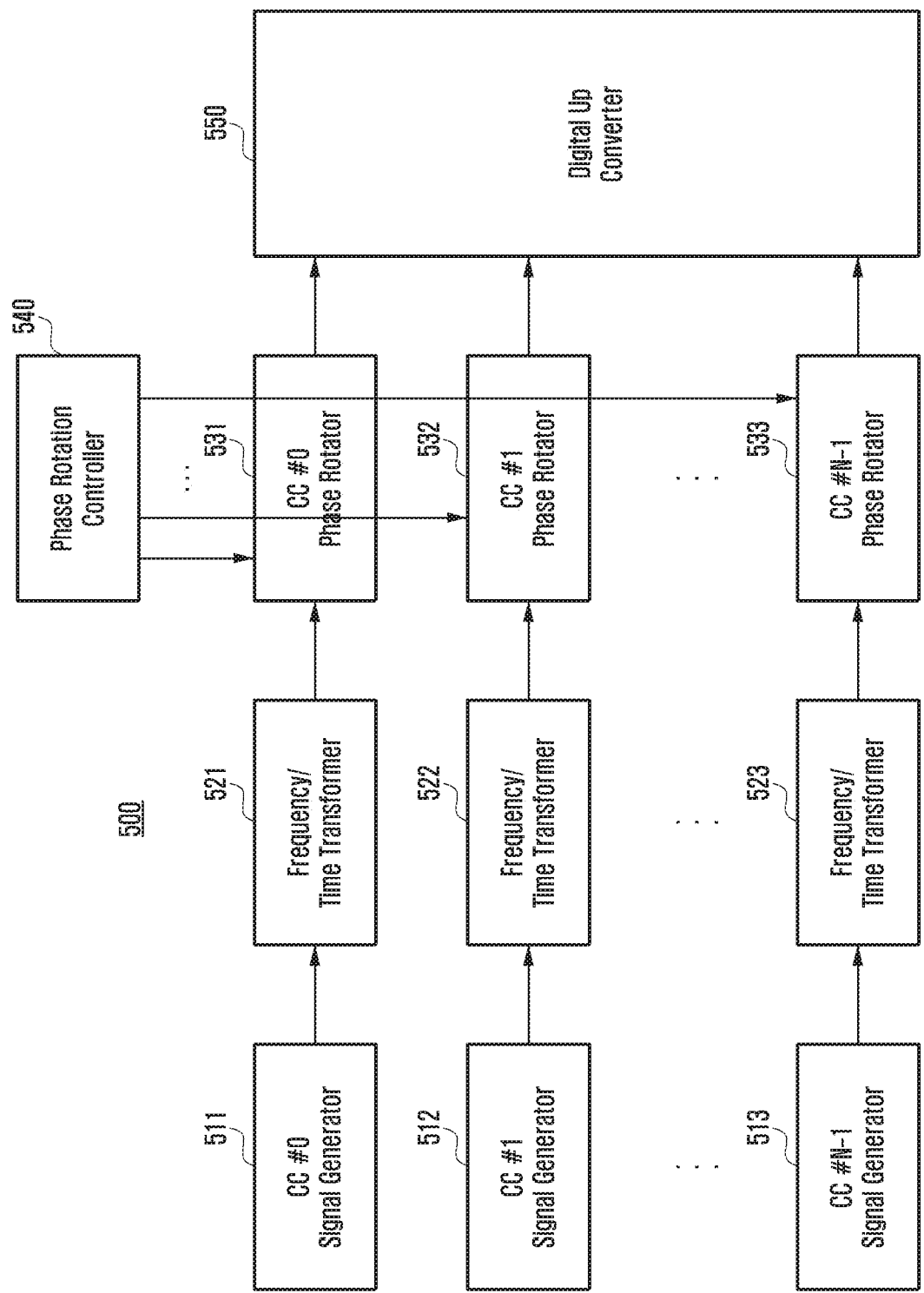
FIGS. 5 and 6 are block diagrams illustrating elements of a transmitting apparatus according to the first embodiment of the present disclosure.

FIG. 5 is a block diagrams illustrating elements of a transmitting apparatus 500 according to the first embodiment of the present disclosure. For example, in FIG. 5, the transmitting apparatus 500 can reduce the PAPR by controlling a phase in units of CC.

Specifically, the transmitting apparatus 500 may include a signal generator 511 for a first CC, a signal generator 512 for a second CC, and a signal generator 513 for an Nth CC. Each of the signal generators 511, 512 and 513 may generate a signal to be transmitted through each of the first to Nth CCs.

For example, each of the signal generators 511, 512 and 513 may generate a synchronizing signal, a RS for demodulation, etc. as well as data to be transmitted for each CC. At this time, each of the signal generators 511, 512 and 513 may generate different signals, depending on given cell information, a time index, and the like.

In addition, the transmitting apparatus 500 may transform the signal generated for each CC into a time component signal through frequency/time conversion. For example, the transmitting apparatus 500 may include a frequency/time transformer 521, a frequency/time transformer 522, and a frequency/time transformer 523. Each of the frequency/time transformers 521, 522 and 523 may transform the signal generated through each of the signal generators 511, 512 and 513 into a time component signal through frequency/time conversion.

Meanwhile, each of a phase rotator 531 for the first CC, a phase rotator 532 for the second CC, and a phase rotator 533 for the Nth CC may apply a predetermined phase to the time component signal of each CC.

Specifically, a phase rotation controller 540 of the transmitting apparatus 500 may determine a phase to be applied to each CC. Also, the phase rotation controller 540 may transmit information about the determined phase to the phase rotators 531, 532 and 533. Then, each of the phase rotators 531, 532 and 533 may rotate the time component signal by each phase value, based on the received phase information.

For example, the phase rotation controller 540 may determine $e^{-j\pi/2}$ as a phase value to be applied to a signal for the first CC, $e^{j0}$ as a phase value to be applied to a signal for the second CC, and $e^{j\pi/2}$ as a phase value to be applied to a signal for the Nth CC. Also, the phase rotation controller 540 may transmit the determined phase values to the phase rotators 531, 532 and 533, respectively.

The phase rotator 531 may multiply the time component signal for the first CC, obtained through the frequency/time transformer 521, by the determined phase value. Similarly, the phase rotator 532 may multiply the time component signal for the second CC, obtained through the frequency/time transformer 522, by the determined phase value, $e^{-j\pi/2}$. Similarly, the phase rotator 533 may multiply the time component signal for the Nth CC, obtained through the frequency/time transformer 523, by the determined phase value, $e^{j\pi/2}$.

Therefore, even though the signal generators 511, 512 and 513 generate signals having the same sequence based on the same PCID, these signals are distinguished from each other by the multiplied different phase values.

A DUC 550 may shift the center frequencies of the different time component signals. Then, the DUC 550 may transmit the signals to an RF unit such as a mixer.

Meanwhile, as described above, in case of the transmission of a RS in one CC, the PAPR may be increased when the sequence is repeated on the frequency axis. Therefore, FIG. 6 is a block diagram illustrating elements of a transmitting apparatus 600 to which the first embodiment is applied so as to reduce the PAPR of signals repeated on the frequency axis within one CC according to an embodiment of the present disclosure.

Figure 6:
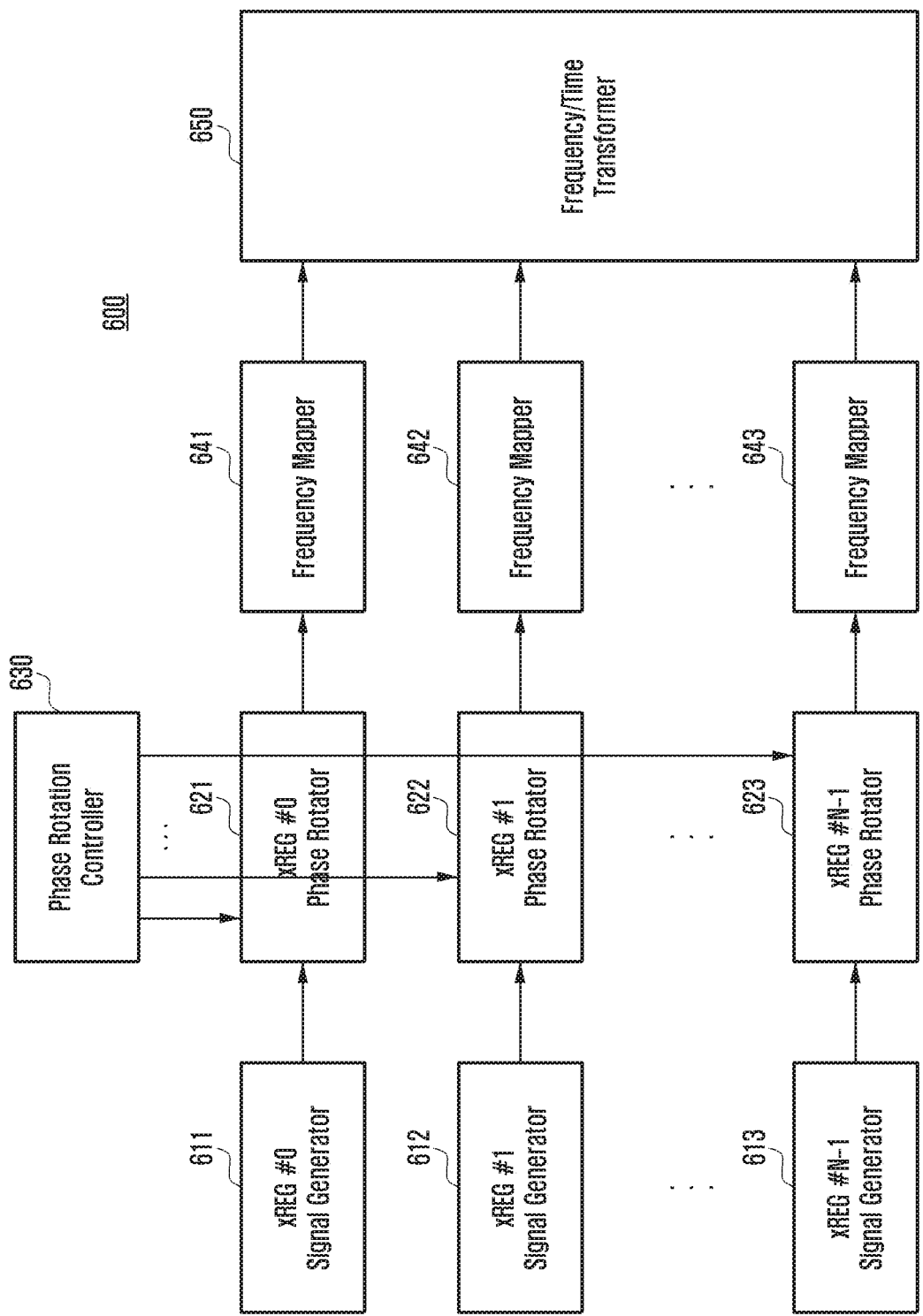

Referring to FIG. 6, the transmitting apparatus 600 may include a signal generator 611 for a first REG, a signal generator 612 for a second REG, and a signal generator 613 for an Nth REG. Each of the signal generators 611, 612 and 613 may generate a signal to be transmitted at each of the first to Nth REGs.

For example, each of the signal generators 611, 612 and 613 may generate a synchronizing signal, a RS for demodulation, etc. as well as data to be transmitted for each REG. At this time, each of the signal generators 611, 612 and 613 may generate different signals, depending on given cell information, a time index, and the like.

In addition, the transmitting apparatus 600 may apply a predetermined phase to each signal generated for each REG.

Specifically, each of a phase rotator 621 for the first REG, a phase rotator 622 for the second REG, and a phase rotator 623 for the Nth REG may apply a predetermined phase value to a frequency component signal of each REG.

Specifically, a phase rotation controller 630 of the transmitting apparatus 600 may determine a phase to be applied to each REG. Also, the phase rotation controller 630 may transmit information about the determined phase to the phase rotators 621, 622 and 623. Then, each of the phase rotators 621, 622 and 623 may rotate the frequency component signal generated for each REG by each phase value, based on the received phase information.

Meanwhile, the frequency component signal to which the phase value for each REG is applied may be mapped to a corresponding RE in the CC. For example, a frequency mapper 641 may map the signal for the first REG, to which the phase value for the first REG is applied, to the RE corresponding to the first REG in the CC. Similarly, a frequency mapper 642 may map the signal for the second REG, to which the phase value for the second REG is applied, to the RE corresponding to the second REG in the CC, and a frequency mapper 643 may map the signal for the Nth REG, to which the phase value for the Nth REG is applied, to the RE corresponding to the Nth REG in the CC.

In addition, a frequency/time transformer 650 may be an inverse fast Fourier transform (IFFT) block. The frequency/time transformer 650 may transform the frequency component signal into a time component signal.

Then, the time component signal may be shifted in a center frequency by a digital up converter, delivered to an RF unit such as a mixer, and transmitted to a receiving apparatus.

The transmission apparatus according to the first embodiment of the present disclosure as shown in FIGS. 5 and 6 can reduce the PAPR by applying a phase rotation in units of frequency blocks. In this case, the receiving apparatus can receive a signal intact through the typical receiving apparatus structure as described above with reference to FIG. 2, regardless of the phase rotation.

Figure 7:
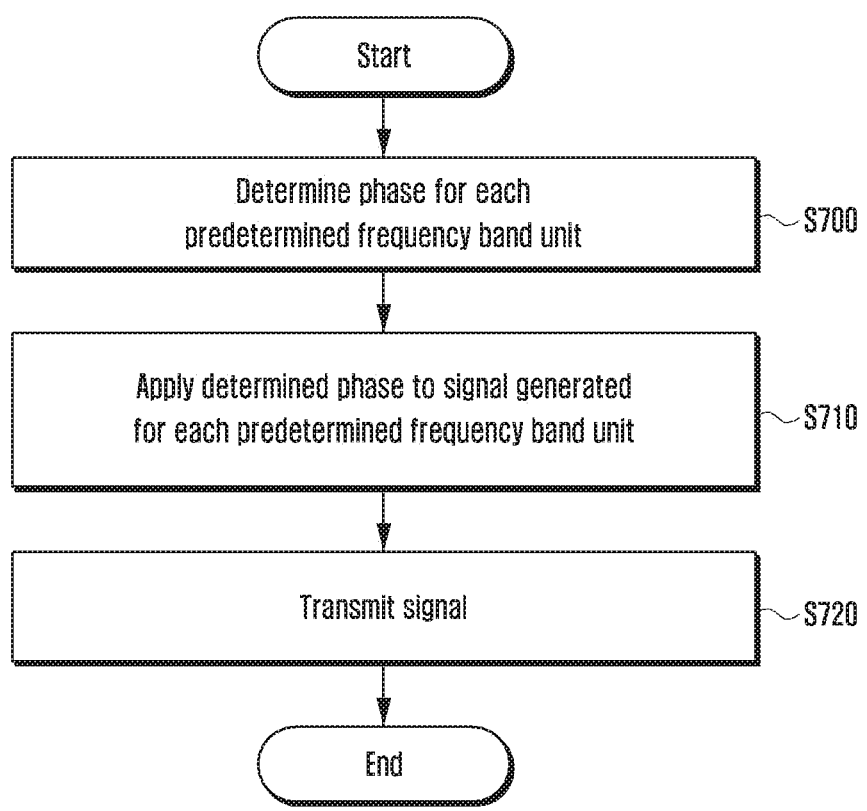
FIG. 7 is a flow diagram illustrating a signal transmission method of a transmitting apparatus according to the first embodiment of the present disclosure.

Meanwhile, FIG. 7 is a flow diagram illustrating a signal transmission method of a transmitting apparatus according to the first embodiment of the present disclosure.

Referring to FIG. 7, at operation S700, the transmitting apparatus may determine a phase for each predetermined frequency band unit. For example, the predetermined frequency band unit may be a CC unit. Alternatively, the predetermined frequency band unit may be a REG unit in an arbitrary CC.

At operation S710, the transmitting apparatus may apply the determined phase to a signal generated for each predetermined frequency band unit. Then, at operation S720, the transmitting apparatus may transmit the signal.

Figure 8:
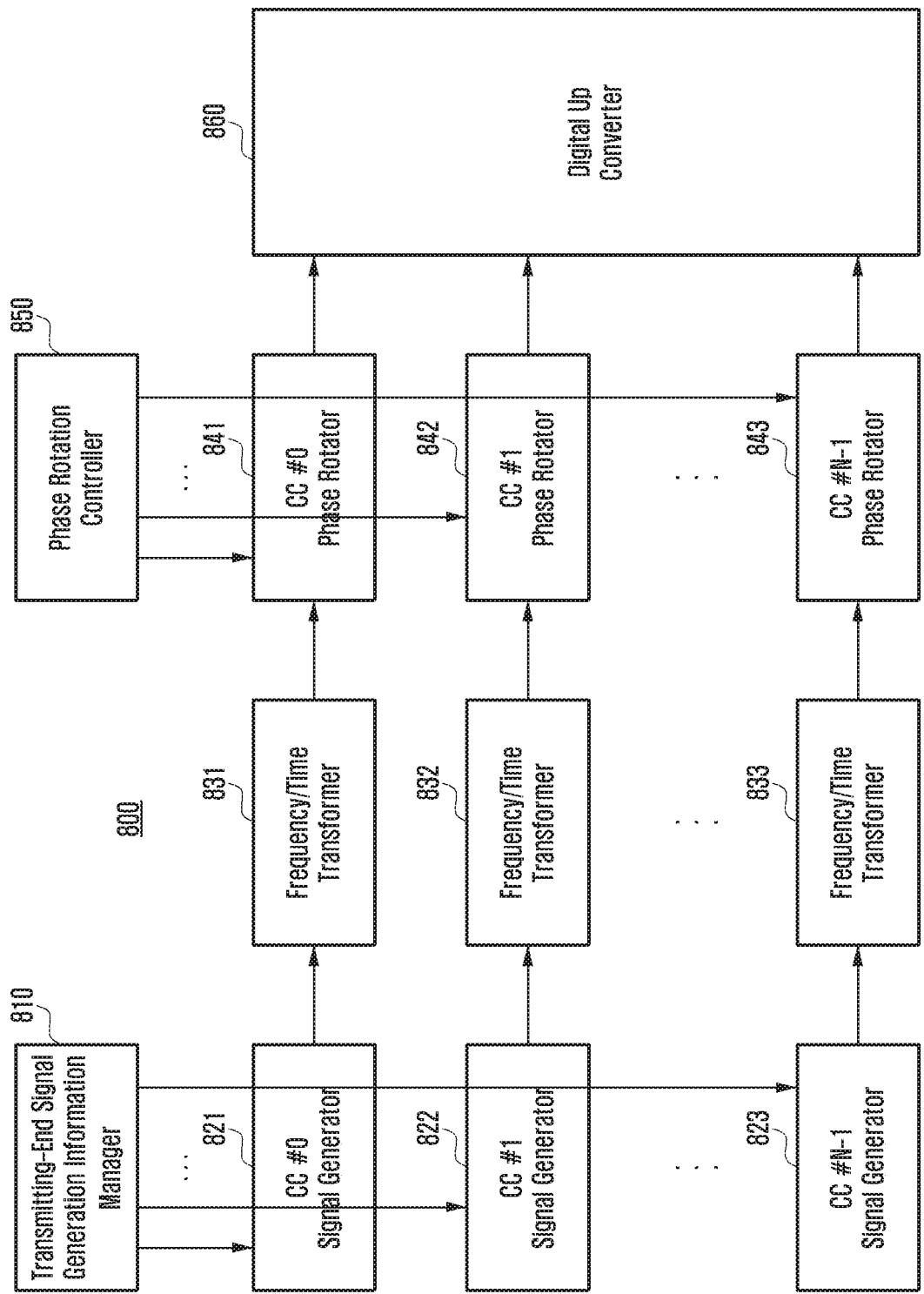
FIG. 8 is a block diagram illustrating elements of a transmitting apparatus according to the second embodiment of the present disclosure.

Meanwhile, FIG. 8 is a block diagram illustrating elements of a transmitting apparatus 800 according to the second embodiment of the present disclosure. The transmitting apparatus 800 is a device for simultaneously transmitting a plurality of CCs, and may include a transmitting-end signal generation information manager 810.

The transmitting-end signal generation information manager 810 may create signal generation information for each arbitrary frequency unit and then transmit the created signal generation information to a signal generator for generating a signal for each arbitrary frequency unit. For example, the arbitrary frequency unit may be a CC unit. Also, the transmitting-end signal generation information manager 810 may create, as the signal generation information, different CC indexes depending on respective CCs.

The transmitting apparatus 800 may transmit the signal generation information created by the transmitting-end signal generation information manager 810 to the receiving apparatus. For example, the transmitting apparatus 800 may transmit the signal generation information to the receiving apparatus through a radio resource control (RRC) message. Therefore, the receiving apparatus described later may have the same signal generation information as the transmitting apparatus has.

In addition, the transmitting apparatus 800 may include a signal generator 821 for a first CC, a signal generator 822 for a second CC, and a signal generator 823 for an Nth CC.

Each of the signal generators 821, 822 and 823 may receive the signal generation information for each CC unit created by the transmitting-end signal generation information manager 810.

Specifically, each of the signal generators 821, 822 and 823 may generate a signal to be transmitted at each of the first to Nth CCs, based on the signal generation information.

For example, each of the signal generators 821, 822 and 823 may generate a synchronizing signal, a RS for demodulation, etc. as well as data to be transmitted for each CC.

At this time, each of the signal generators 821, 822 and 823 may generate different signals, based on the signal generation information received from the transmitting-end signal generation information manager 810 as well as given cell information, a time index, and the like.

In addition, the transmitting apparatus 800 may transform the signal generated for each CC into a time component signal through frequency/time conversion. For example, the transmitting apparatus 800 may include a frequency/time transformer 831, a frequency/time transformer 832, and a frequency/time transformer 833. For example, each of the frequency/time transformers 831, 832 and 833 may be an IFFT block.

Each of the frequency/time transformers 831, 832 and 833 may transform the signal generated through each of the signal generators 821, 822 and 823 into a time component signal through frequency/time conversion.

Meanwhile, each of a phase rotator 841 for the first CC, a phase rotator 842 for the second CC, and a phase rotator 843 for the Nth CC may apply a predetermined phase to the time component signal of each CC.

Specifically, a phase rotation controller 850 of the transmitting apparatus 800 may determine a phase to be applied to each CC. Also, the phase rotation controller 850 may transmit information about the determined phase to the phase rotators 841, 842 and 843. Then, each of the phase rotators 841, 842 and 843 may rotate the time component signal by each phase value, based on the received phase information.

For example, the phase rotation controller 850 may determine $e^{-j\pi/2}$ as a phase value to be applied to a signal for the first CC, $e^{j0}$ as a phase value to be applied to a signal for the second CC, and $e^{j\pi/2}$ as a phase value to be applied to a signal for the Nth CC. Also, the phase rotation controller 850 may transmit the determined phase values to the phase rotators 841, 842 and 843, respectively.

The phase rotator 841 for the first CC may multiply the time component signal for the first CC, obtained through the frequency/time transformer 831, by the determined phase value, $e^{-j\pi/2}$. Similarly, the phase rotator 842 for the second CC may multiply the time component signal for the second CC, obtained through the frequency/time transformer 832, by the determined phase value, $e^{j0}$. Similarly, the phase rotator 843 for the Nth CC may multiply the time component signal for the Nth CC, obtained through the frequency/time transformer 833, by the determined phase value, $e^{j\pi/2}$.

Meanwhile, according to another embodiment, the transmitting apparatus 800 may not perform the operations of the phase rotation controller 850 and the phase rotators 841, 842 and 843. Specifically, the signal generators 821, 822 and 823 of the transmitting apparatus 800 may generate signals of different sequences, based on the created signal generation information. Therefore, the transmitting apparatus 800 may not perform the operations of applying different phase values for the respective CCs to rotation so as to generate signals of different sequences.

In addition, a DUC 860 may shift the center frequencies of the different time component signals. Then, the DUC 860 may transmit the signals to an RF unit such as a mixer.

Figure 9:
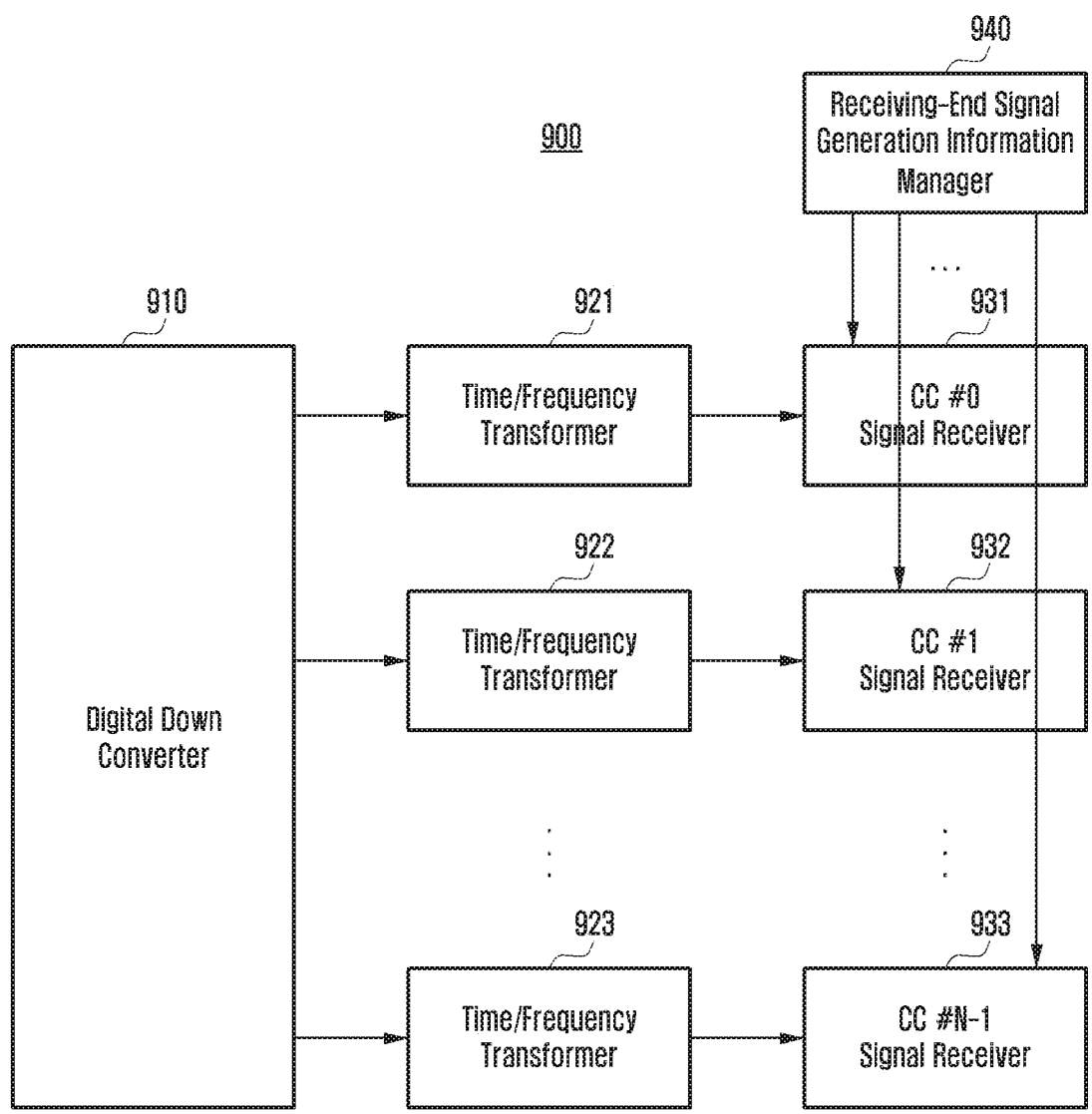
FIG. 9 is a block diagram illustrating elements of a receiving apparatus according to the second embodiment of the present disclosure.

FIG. 9 is a block diagram illustrating elements of a receiving apparatus 900 according to the second embodiment of the present disclosure.

The receiving apparatus 900 may receive signals from the transmitting apparatus 800. In addition, as described above, the receiving apparatus 900 may receive and store in advance the signal generation information created by the transmitting apparatus 800.

The receiving apparatus 900 may separate a signal of each center frequency into signals for respective CCs through a DDC 910.

The receiving apparatus 900 may transform the separated signal for each CC into a frequency component signal through time/frequency conversion. For example, the receiving apparatus 900 may include a time/frequency transformer 921, a time/frequency transformer 922, and a time/frequency transformer 923. Each of the time/frequency transformers 921, 922 and 923 may be a fast Fourier transform (FFT) block.

Each of the time/frequency transformers 921, 922 and 923 may transform the signal separated for each CC into a frequency component signal through time/frequency conversion.

In addition, the receiving apparatus 900 may perform the reception of a signal for each CC. For example, the receiving apparatus 900 may include a signal receiver 931 for a first CC, a signal receiver 932 for a second CC, and a signal receiver 933 for an Nth CC.

The signal receivers 931, 932 and 933 may recognize the operations of the signal generators 821, 822 and 823 of the transmitting apparatus 800 and then obtain synchronization by estimating a synchronizing signal. In addition, the signal receivers 931, 932 and 933 may estimate a RS for demodulation and use it for channel estimation. Also, the signal receivers 931, 932 and 933 may demodulate a data channel, based on the obtained information.

At this time, each of the signal receivers 931, 932 and 933 may accurately predict the transmitted signal by using the signal generation information transmitted from the transmitting apparatus 800.

A receiving-end signal generation information manager 940 may receive and store the signal generation information created by the transmitting apparatus 800. In addition, the receiving-end signal generation information manager 940 may deliver the corresponding signal generation information for each CC to each of the signal receivers 931, 932 and 933.

According to the second embodiment of the present disclosure, the transmitting-end signal generation information manager 810 and the receiving-end signal generation information manager 940 should have the same value through prearranged agreement about the signal generation information for each CC in order to prevent a problem in signal reception. Thus, as described above, the transmitting apparatus 800 may transmit in advance the signal generation information for each CC to the receiving apparatus 900. Here, the transmitting apparatus 800 may be a base station, and the receiving apparatus 900 may be a user terminal.

Figure 10:
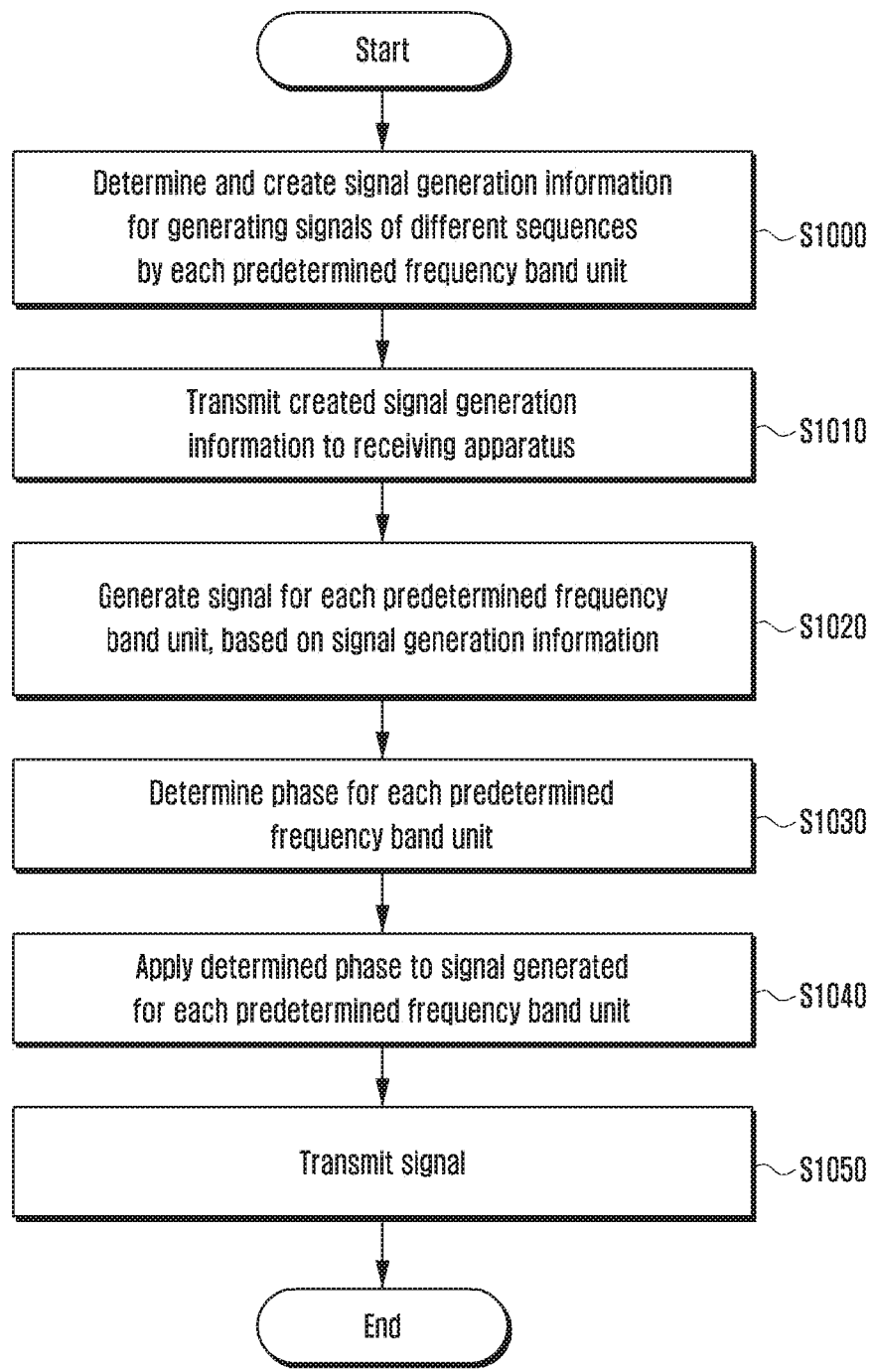
FIG. 10 is a flow diagram illustrating a signal transmission method of a transmitting apparatus according to the second embodiment of the present disclosure.

Meanwhile, FIG. 10 is a flow diagram illustrating a signal transmission method of a transmitting apparatus according to the second embodiment of the present disclosure.

At operation S1000, the transmitting apparatus may determine signal generation information for generating signals of different sequences by each predetermined frequency band unit. For example, the predetermined frequency band unit may be a CC unit. Additionally or alternatively, the predetermined frequency band unit may be a REG unit in an arbitrary CC. Also, the signal generation information may be different CC indexes depending on respective CCs.

At operation S1010, the transmitting apparatus may transmit created signal generation information to the receiving apparatus. At this time, the transmitting apparatus may transmit the signal generation information to the receiving apparatus through a RRC message.

At operation S1020, the transmitting apparatus may generate a signal for each predetermined frequency band unit, based on the signal generation information. For example, the transmitting apparatus may generate signals of different sequences, based on the signal generation information as well as given cell information, a time index, and the like.

At operation S1030, the transmitting apparatus may determine a phase for each predetermined frequency band unit. Also, at operation S1040, the transmitting apparatus may apply the determined phase to a signal generated for each predetermined frequency band unit. Then, at operation S1050, the transmitting apparatus may transmit the signal.

On the other hand, as described above, the receiving apparatus may receive the signal generation information for generating signals of different sequences by each predetermined frequency band unit. In addition, when a signal generated for each predetermined frequency band unit is received from the transmitting apparatus, the receiving apparatus may decode the received signal, based on the signal generation information.

Figure 11:
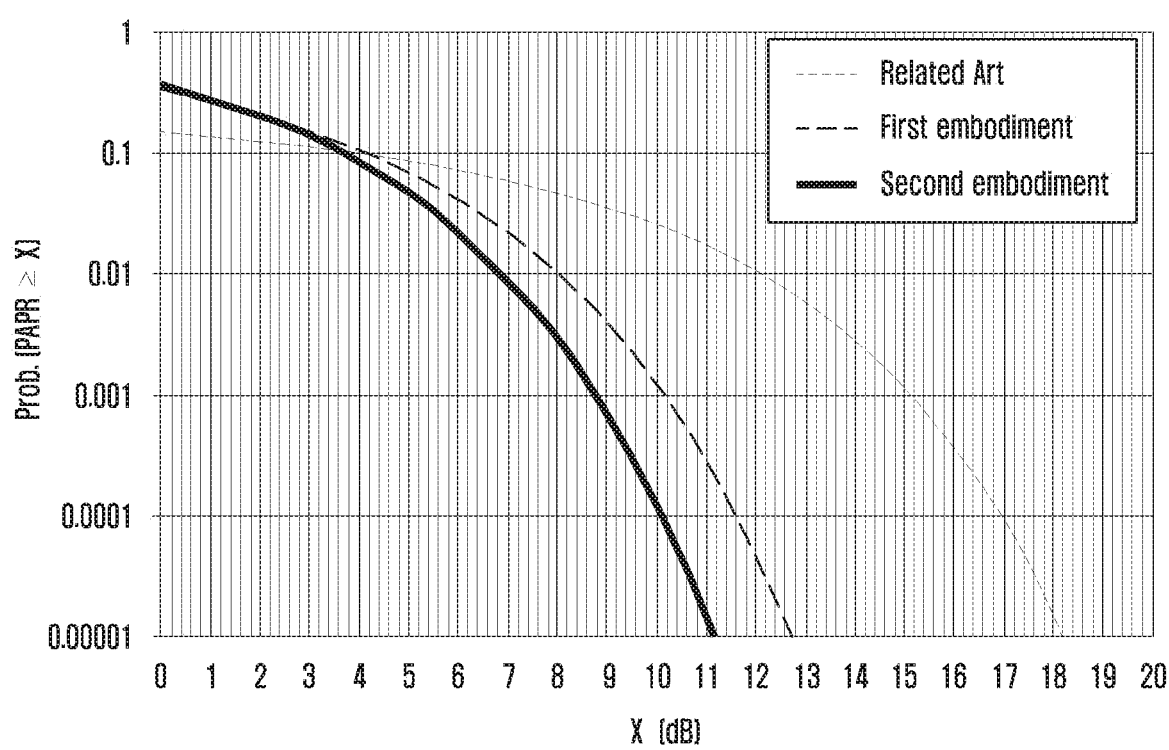
FIG. 11 is a diagram illustrating a peak-to-average power ratio (PAPR) reduction effect according to the present disclosure.

Meanwhile, FIG. 11 is a diagram illustrating a PAPR reduction effect according to the present disclosure. FIG. 11 shows that the effect of reducing the PAPR can be obtained when the transmitting apparatus generates and transmits a signal according to the first or second embodiment of the present disclosure.

As a result, according to the present disclosure, the PAPR can be reduced in the wireless communication system that uses a plurality of frequency resources simultaneously. In addition, with the PAPR reduced, the transmitting apparatus can improve the throughput and coverage by transmitting signals with higher average power.

The elements of the above-described apparatuses may be implemented in software. For example, the signal generation information managers of the transmitting apparatus and the receiving apparatus or the phase rotation controller of the transmitting apparatus may further include a flash memory or any other nonvolatile memory. In this nonvolatile memory, a program for performing the operations of the signal generation information manager or the phase rotation controller may be stored.

In addition, the signal generation information managers of the transmitting apparatus and the receiving apparatus or the phase rotation controller of the transmitting apparatus may be implemented in the form of including a CPU and a random access memory (RAM). In this case, the CPU may perform the above-discussed operations by copying programs stored in the nonvolatile memory to the RAM and then executing the copied programs.

The above manager or controller may be used in the same meaning as a CPU, a microprocessor, a control unit, a processor, and an operating system. Also, the manager or controller may be implemented as a single-chip system (also referred to as a system-on-a-chip, a system on chip (SOC), or SoC) together with other functional units such as a communication module.

Meanwhile, the signal transmission method of the transmitting apparatus according to various embodiments described above may be software-coded and stored in a non-transitory readable medium. This non-transitory readable medium may be mounted and used in various devices.

The non-transitory readable medium means a medium that is readable by a device and stores data semipermanently rather than a medium that stores data for a short period of time, such as a register, cache, memory, etc. Specifically, the non-transitory readable medium may be a compact disc (CD), a digital versatile disc (DVD), a hard disk, a Blu-ray disk, a universal serial bus (USB), a memory card, a read-only memory (ROM), or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A signal transmission method of a transmitting apparatus in a wireless communication system, the method comprising:
   determining a plurality of phases for a plurality of frequency band units in a component carrier (CC);
   applying the determined plurality of phases to signals generated for the plurality of frequency band units; and
   transmitting the signals,
   wherein each of the determined plurality of phases is applied to a signal of a corresponding frequency band unit among the plurality of frequency band units, and
   wherein each of the plurality of frequency band unit is a resource element group (REG) unit in an arbitrary CC.

2. The method of claim 1,
   wherein a same sequence is used to generate the signals for the plurality of frequency band units,
   wherein the plurality of frequency band units increase a peak to average power ratio (PAPR) of the signals more than a threshold, and
   wherein the plurality of phases are determined to reduce the PAPR of the signals.

3. The method of claim 1, further comprising:
   determining signal generation information to generate a time domain signal for the plurality of frequency band units based on the signals; and
   generating the time domain signal for the plurality of frequency band units, based on the signal generation information.

4. The method of claim 3, further comprising:
   transmitting the signal generation information to a receiving apparatus before transmitting the generated time domain signal to the receiving apparatus,
   wherein the signal generation information is transmitted to the receiving apparatus through a radio resource control (RRC) message.

5. The method of claim 1, further comprising:
   determining a plurality of phases for a plurality of CCs including the CC; and
   applying the plurality of phases for the plurality of CCs to each of the CCs.

6. A transmitting apparatus in a wireless communication system, the transmitting apparatus comprising:
   a transceiver configured to transmit and receive a signal; and
   a controller configured to:
      determine a plurality of phases for a plurality of frequency band units in a component carrier (CC),
      apply the determined plurality of phases to signals generated for the plurality of frequency band units, and
      control the transceiver to transmit the signals,
   wherein each of the determined plurality of phases is applied to a signal of a corresponding frequency band unit among the plurality of frequency band units, and
   wherein each of the plurality of frequency band unit is a resource element group (REG) unit in an arbitrary CC.

7. The transmitting apparatus of claim 6,
wherein a same sequence is used to generate the signals for the plurality of frequency band units,
wherein the plurality of frequency band units increase a peak to average power ratio (PAPR) of the signals more than a threshold, and
wherein the plurality of phases are determined to reduce the PAPR of the signals.

8. The transmitting apparatus of claim 6, wherein the controller is further configured to:
determine signal generation information to generate a time domain signal for the plurality of frequency band units based on the signals, and
generate the time domain signal for the plurality of frequency band units, based on the signal generation information.

9. The transmitting apparatus of claim 8,
wherein the controller is further configured to control the transceiver to transmit the signal generation information to a receiving apparatus before transmitting the generated time domain signal to the receiving apparatus, and
wherein the signal generation information is transmitted to the receiving apparatus through a radio resource control (RRC) message.

10. The transmitting apparatus of claim 9, wherein the controller is further configured to:
determine a plurality of phases for a plurality of CCs including the CC, and
apply the plurality of phases for the plurality of CCs to each of the CCs.

11. A signal reception method of a receiving apparatus in a wireless communication system, the method comprising:
receiving a signal from a transmitting apparatus; and
decoding the signal,
wherein a plurality of phases determined for a plurality of frequency band units in a component carrier (CC) are applied to the signal generated for the plurality of frequency band units,
wherein each of the determined plurality of phases is applied to a signal of a corresponding frequency band unit among the plurality of frequency band units,
wherein each of the plurality of frequency band unit is a resource element group (REG) unit in an arbitrary CC, and
wherein the signal is decoded based on the plurality of phases.

12. The method of claim 11,
wherein signal generation information is received through a radio resource control (RRC) message,
wherein the signal is decoded based on the signal generation information, and
wherein the signal generation information is received from a transmitting apparatus before the signal generated for each of the plurality of frequency band units is received from the transmitting apparatus.

13. The method of claim 11,
wherein a same sequence is used to generate the signal for the plurality of frequency band units,
wherein the plurality of frequency band units increase a peak to average power ratio (PAPR) of the signal more than a threshold, and
wherein the plurality of phases are determined to reduce the PAPR of the signal.

14. The method of claim 11,
wherein a plurality of phases determined for a plurality of CCs including the CC is applied to each of the CCs, and
wherein the signal is decoded based on the plurality of phases for the plurality of CCs.

15. A receiving apparatus in a wireless communication system, the receiving apparatus comprising:
a transceiver configured to transmit and receive a signal; and
a controller configured to:
control the transceiver to receive a signal from a transmitting apparatus, and
decode the signal,
wherein a plurality of phases determined for a plurality of frequency band units in a component carrier (CC) are applied to the signal generated for the plurality of frequency band units,
wherein each of the determined plurality of phases is applied to a signal of a corresponding frequency band unit among the plurality of frequency band units,
wherein each of the plurality of frequency band unit is a resource element group (REG) unit in an arbitrary CC, and
wherein the signal is decoded based on the plurality of phases.

16. The receiving apparatus of claim 15,
wherein signal generation information is received through a radio resource control (RRC) message,
wherein the signal is decoded based on the signal generation information, and
wherein the controller is further configured to control the transceiver to receive the signal generation information from a transmitting apparatus before the signal generated for each of the plurality of frequency band units is received from the transmitting apparatus.

17. The receiving apparatus of claim 15,
wherein a same sequence is used to generate the signal for the plurality of frequency band units,
wherein the plurality of frequency band units increase a peak to average power ratio (PAPR) of the signal more than a threshold, and
wherein the plurality of phases are determined to reduce the PAPR of the signal.

18. The receiving apparatus of claim 15,
wherein a plurality of phases determined for a plurality of CCs including the CC is applied to each of the CCs, and
wherein the signal is decoded based on the plurality of phases for the plurality of CCs.

* * * * *